US010609332B1

(12) United States Patent
Turbell et al.

(10) Patent No.: US 10,609,332 B1
(45) Date of Patent: Mar. 31, 2020

(54) VIDEO CONFERENCING SUPPORTING A COMPOSITE VIDEO STREAM

(71) Applicant: Microsoft Technology Licensing, LLC, Redmond, WA (US)

(72) Inventors: Henrik Valdemar Turbell, Redmond, WA (US); Matthew Jason Pope, Seattle, WA (US); John C. Tang, Palo Alto, CA (US); Gina D. Venolia, Kailua, HI (US); David Yuheng Zhao, Redmond, WA (US); Kori Marie Inkpen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/230,983

(22) Filed: Dec. 21, 2018

(51) Int. Cl.
*H04N 7/14* (2006.01)
*H04N 7/15* (2006.01)
(Continued)

(52) U.S. Cl.
CPC ......... *H04N 7/152* (2013.01); *G06K 9/00228* (2013.01); *H04N 7/141* (2013.01);
(Continued)

(58) Field of Classification Search
CPC ....................................................... H04N 7/14
See application file for complete search history.

(56) References Cited

U.S. PATENT DOCUMENTS 8,099,462 B2  1/2012 Sheng et al.
8,766,983 B2  7/2014 Marks et al.
(Continued)

FOREIGN PATENT DOCUMENTS

EP  2775452 A1  9/2014
EP  3276943 A1  1/2018
EP  3276951 A1  1/2018

OTHER PUBLICATIONS

"How do I use the Dual Camera features on my Galaxy S5?", Retrieved from https://www.samsung.com/ie/support/mobile-devices/how-do-i-use-the-dual-camera-features-on-my-galaxy-s5/, Retrieved on: Dec. 18, 2018, 5 Pages.
(Continued)

*Primary Examiner* — Olisa Anwah
(74) *Attorney, Agent, or Firm* — Alleman Hall Creasman & Tuttle LLP (57) ABSTRACT

According to a disclosed example, a first video stream is captured via a first camera associated with a first communication device engaged in a multi-party video conference. The first video stream includes a plurality of two-dimensional image frames. A subset of pixels corresponding to a first human subject is identified within each image frame of the first video stream. A second video stream is captured via a second camera associated with a second communication device engaged in the multi-party video conference. A composite video stream formed by at least a portion of the second video stream and the subset of pixels of the first video stream is rendered, and the composite video stream is output for display at one or more of the first and/or second communication devices. The composite video stream may provide the appearance of remotely located participants being physically present within the same visual scene.

20 Claims, 4 Drawing Sheets

(51) Int. Cl.
*H04N 21/431* (2011.01)
*G06K 9/00* (2006.01)
*H04N 21/2187* (2011.01)

(52) U.S. Cl.
CPC ......... *H04N 7/157* (2013.01); *H04N 21/2187* (2013.01); *H04N 21/4316* (2013.01)

(56) References Cited

U.S. PATENT DOCUMENTS

| | | | |
|---|---|---|---|
| 9,819,716 | B2 | 11/2017 | Kim |
| 9,979,921 | B2* | 5/2018 | Holmes ............. G06K 9/00335 |
| 2002/0158873 | A1 | 10/2002 | Williamson |
| 2008/0215972 | A1 | 9/2008 | Zalewski et al. |
| 2008/0263460 | A1 | 10/2008 | Altberg et al. |
| 2012/0268552 | A1 | 10/2012 | Choi et al. |
| 2013/0141519 | A1 | 6/2013 | Sayeed et al. |
| 2014/0184721 | A1 | 7/2014 | Zhang et al. |
| 2014/0267546 | A1 | 9/2014 | Kwon et al. |
| 2016/0210998 | A1* | 7/2016 | Leske ..................... G06T 11/60 |
| 2016/0301727 | A1 | 10/2016 | Barjonas et al. |
| 2018/0160055 | A1 | 6/2018 | Taine et al. |

OTHER PUBLICATIONS

"Introducing Teleporter", Retrieved from https://www.youtube.com/watch?v=XPSJMGhbPSM, Oct. 16, 2017, 4 Pages.

"Personify Teleporter on ARCore", Retrieved from https://www.youtube.com/watch?v=O7XUuNIVusE, Mar. 27, 2018, 4 Pages.

"Your Webcam, Enhanced", Retrieved from https://personifyinc.com/products/chromacam, Retrieved on Nov. 17, 2018, 1 Page.

Ames, et al., "Requirements for Mobile Photoware", In Journal of Personal and Ubiquitous Computing, vol. 14, Issue 2, Jun. 6, 2009, pp. 95-109.

Badrinarayanan, et al., "SegNet: A Deep Convolutional Encoder-Decoder Architecture for Image Segmentation", Retrieved from https://arxiv.org/pdf/1511.00561.pdf, Nov. 2, 2015, 14 Pages.

Brutzer, et al., "Evaluation of Background Subtraction Techniques for Video Surveillance", In Proceedings of the Conference on Computer Vision and Pattern Recognition, Jun. 20, 2011, pp. 1937-1944.

Diehl, et al., "How Taking Photos Increases Enjoyment of Experiences", In Journal of Personality and Social Psychology, vol. 111, Issue 2, Aug. 1, 2016, pp. 119-140.

Harrison, et al., "Re-Place-ing Space: The Roles of Place and Space in Collaborative Systems", In Proceedings of the Conference on Computer-Supported Cooperative Work, Nov. 16, 1996, pp. 67-76.

Hunter, et al., "WaaZam! Supporting Creative Play at a Distance in Customized Video Environments", in Proceedings of the SIGCHI Conference on Human Factors in Computing Systems, Apr. 26, 2014, pp. 1197-1206.

Inkpen, et al., "Experiences2Go: Sharing Kids' Activities Outside the Home with Remote Family Members", In Proceedings of the Conference on Computer Supported Cooperative Work, Feb. 23, 2013, pp. 1329-1340.

Kim, et al., "The Nomad and the Couch Potato: Enriching Mobile Shared Experiences with Contextual Information", In Proceedings of the 18th International Conference on Supporting Group Work, Nov. 9, 2014, pp. 167-177.

Long, et al., "Fully Convolutional Networks for Semantic Segmentation", In Proceedings of the IEEE Conference on Computer Vision and Pattern Recognition, Mar. 8, 2015, 10 Pages.

Lucas D., "With RealSense or Personify, Replace Your Background During a Video Conference to Look Professional", Retrieved from https://www.videoconferencingdaily.com/latest-technology/video-calling-camouflage-replace-background-interview-look-professional/, Feb. 14, 2017, 4 Pages.

Morikawa, et al., "HyperMirror: Toward Pleasant-to-use Video Mediated Communication System", In Proceedings of the ACM Conference on Computer Supported Cooperative Work, Nov. 1, 1998, pp. 149-158.

Nawahdah, et al., "Being Here: Enhancing the Presence of a Remote Person through Real-Time Display Integration of the Remote Figure and the Local Background", In Journal of Open Virtual Reality, vol. 17, Issue 2, Jun. 2012, 9 Pages.

O'Hara, et al., "Everyday Practices with Mobile Video Telephony", In Proceedings of the Conference on Human Factors in Computing Systems, Apr. 22, 2006, pp. 871-880.

Roussel, Nicolas, "Experiences in the Design of the Well, a Group Communication Device for Teleconviviality", In Proceedings of the ACM International Conference on Multimedia, Dec. 1, 2002, pp. 146-152.

Wang, et al., "Let me Take a Selfie: Exploring the Psychological Effects of Posting and Viewing Selfies and Groupies on Social Media", In Journal of Telematics and Informatics, vol. 34, Issue 4, Jul. 1, 2017, pp. 274-283.

Yarosh, et al., "Towards a Questionnaire for Measuring Affective Benefits and Costs of Communication Technologies", In Proceedings of the 17th ACM Conference on Computer Supported Cooperative Work & Social Computing, Feb. 15, 2014, pp. 84-96.

Zezima, Katie, "When Soldiers Go to War, Flat Daddies Hold Their Place at Home", In the New York Times, Sep. 30, 2006, 4 Pages.

"International Search Report and Written Opinion Issued in PCT Application No. PCT/US2019/050911", dated Dec. 9, 2019, 15 Pages.

* cited by examiner

VIDEO CONFERENCING SUPPORTING A COMPOSITE VIDEO STREAM

BACKGROUND

Video conferencing enables participants to see and hear each other via remotely located communication devices. During a video conference, a view of a remote camera stream may be presented concurrently with a view of a local camera stream in separate, pre-defined graphical windows of a display device. For example, the remote camera stream may be presented within a window having a larger size than the local camera stream.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In an example of the present disclosure, a first video stream is captured via a first camera associated with a first communication device engaged in a multi-party video conference. The first video stream includes a plurality of two-dimensional image frames. A subset of pixels corresponding to a first human subject is identified within each image frame of the first video stream. A second video stream is captured via a second camera associated with a second communication device engaged in the multi-party video conference. A composite video stream formed by at least a portion of the second video stream and the subset of pixels of the first video stream is rendered, and the composite video stream is output for display at one or more of the first and/or second communication devices. The composite video stream may provide the appearance of remotely located participants being physically present within the same visual scene.

DETAILED DESCRIPTION

Figure 1:
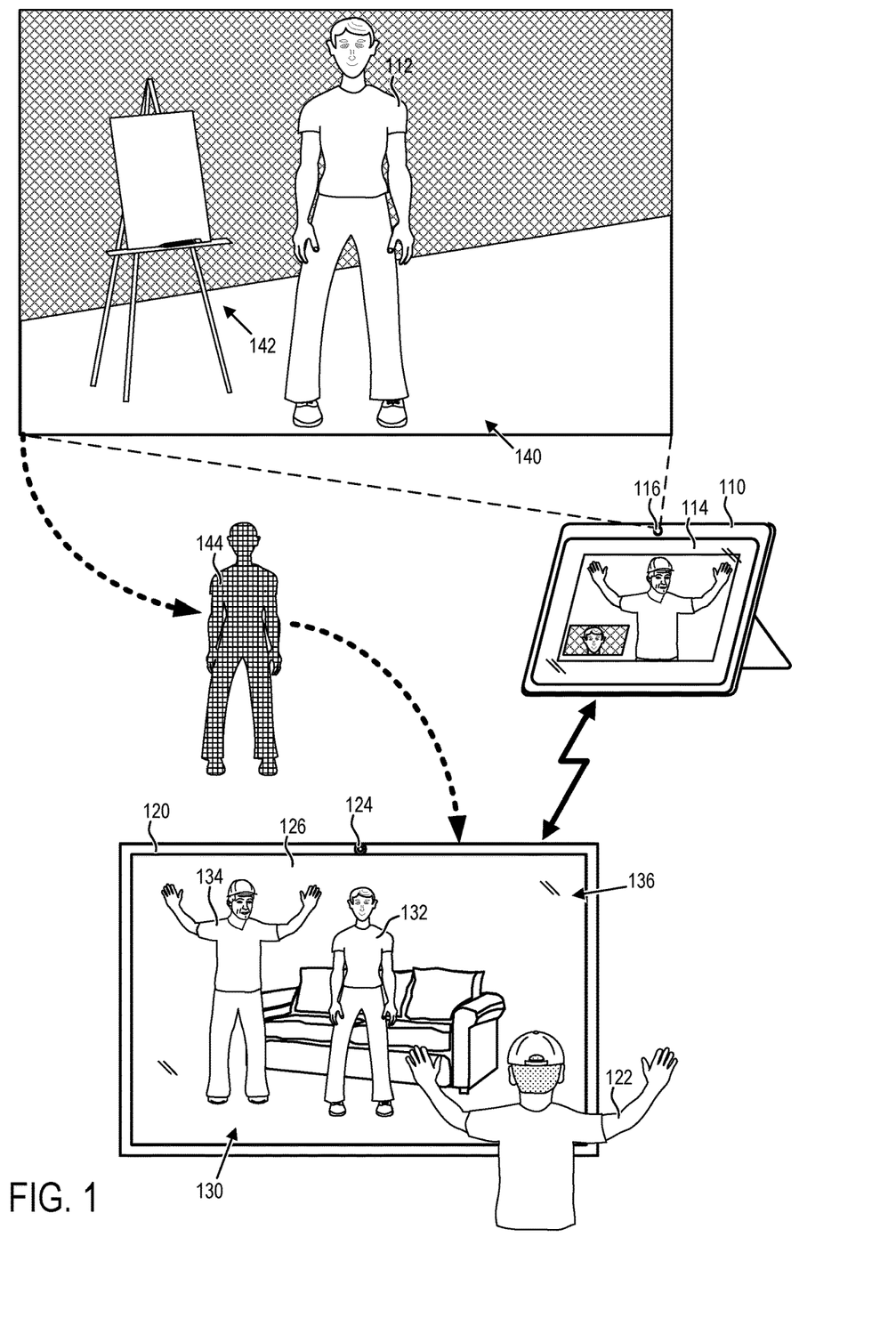
FIG. 1 depicts an example of a video conference conducted between a first communication device operated by a first user and a second communication device operated by a second user.

FIG. 1 depicts an example of a video conference conducted between a first communication device 110 operated by a first user 112 and a second communication device 120 operated by a second user 122. First and second communication devices 110, 120 may be remotely located from each other while engaged in the video conference. In the example depicted in FIG. 1, portions of video streams capturing first user 112 and second user 122 are combined into a composite video stream that may be displayed via a display device of the first and second communication devices 110, 120. The composite video stream may provide the appearance of first user 112 and second user 122 being physically present within the same visual scene.

Within FIG. 1, for example, second communication device 120 is depicted displaying a composite video stream 130 via a display device 126 that includes both the first user 112 represented at 132 and the second user 122 represented at 134. In this example, the video conference is conducted using a tablet computer as first communication device 110 and a large format display as second communication device 120. In other examples, any computing device or electronic device suitable for video conferencing may be used. For example, a user may participate in a video conference using a mobile device, such as a smart phone. Mobile devices may allow users visiting locations of interest (e.g., museums, viewpoints, events, houses of friends/families, etc.) to create the appearance that remotely located participants of the video conference are also present at the location of interest. Participation in a video conference may be made more interactive and enjoyable by visually placing two or more remotely located participants of a video conference in a common scene or environment.

As described in further detail herein, some or all of the participants of a video conference that are captured in a video stream may be segmented from a background region of their own video stream and combined with at least a portion of another participant's video stream to obtain a composite video stream that may be displayed to some or all of the participants. For example, within FIG. 1, first user 112 or a portion thereof captured by a camera 116 of first communication device 110 within a real-world scene 140 may be segmented from background region 142 of the scene to obtain a subset of pixels forming a mask region 144 of the video stream that corresponds to the first user. Mask region 144 may approximate a silhouette of first user 112 or a portion thereof, and therefore may have an irregular shape that may vary from frame to frame of the video stream. Mask region 144 corresponding to the first user may be combined with at least a portion of a second video stream captured by a camera 124 of second communication device 120 that includes second user 122 or a portion thereof to obtain the composite video stream.

In an example, a composite video stream may include one or more mask regions segmented from a first video stream that is overlaid upon a second video stream. For example, the second video stream may capture second user 122 (represented at 134) and may feature a real-world scene 136 within which the second user is physically located. Mask region 144 corresponding to first user 112 (represented at 132) may be overlaid upon the second video stream containing the second user (represented at 134) and real-world scene 136 to obtain composite video stream 130. In this example, real-world scene 136 may correspond to a living room containing a couch of second user 122.

Figure 4:
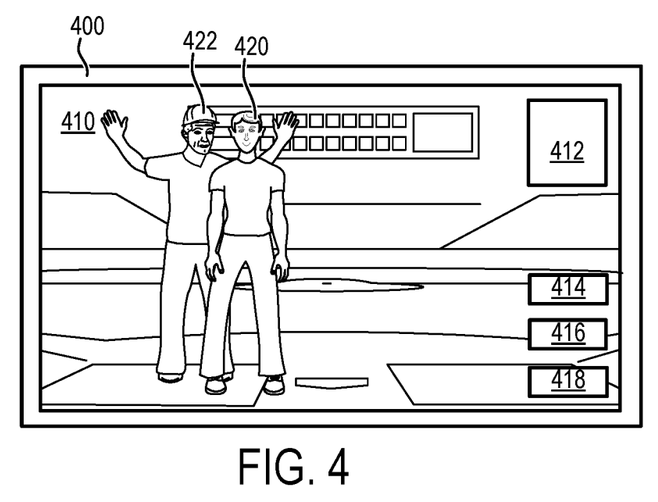
FIG. 4 is a schematic diagram depicting an example graphical user interface.

In another example, a composite video stream may include one or more mask regions segmented from two or more video streams that are overlaid upon background imagery, such as a background image or video. For example, the real-world scene depicted at 136 within composite video stream 130 may instead take the form of background imagery that does not represent a real-world scene of any of the users included in the composite video stream, such as depicted in FIG. 4. In this example, second user 122 may be segmented from a background region of the scene captured in a video stream to obtain a subset of pixels forming a mask region of the video stream that corresponds to the second user, as previously described with respect to the first user.

In some examples, participants of a video conference may be able to select whether to view (1) a composite video stream of multiple, remotely located participants, (2) individual video streams of the participants, or (3) some combination thereof. For example, referring again to FIG. 1, communication device 110 includes a display device 114 that displays a video stream containing second user 122 captured by camera 124 of second communication device 120 and a video stream containing first user 112 captured by camera 114 of the first communication device. In this example, the video stream captured by camera 114 (i.e., the local video stream) is presented as a thumbnail view overlaid upon or presented alongside the video stream captured by camera 124 (i.e., the remote video stream). However, other suitable configurations may be used. Also, first user 112 may instead select to view a composite video stream via display device 114, which may be visually identical to or differ from composite video stream 130 displayed via display device 126 of second communication device 120.

As previously described, the one or more mask regions segmented from a source video stream for inclusion in a composite video stream may have a shape that approximates a shape of a human subject or a portion thereof. By removing background features from the source video stream, the visual representation of the human subject defined by the mask region may provide the appearance that the human subject is present within a visual scene of the composite video stream. This feature is in contrast to the use of separate, pre-defined graphical windows having a geometric or regular shape (e.g., a rectangular window) for concurrently presenting two or more video streams, such as presented by display device 114 in FIG. 1. By providing the appearance of two or more remotely located participants being located in a common scene, the composite video stream may increase the feeling of interactivity, fun, and togetherness among participants of the video conference.

Figure 2:
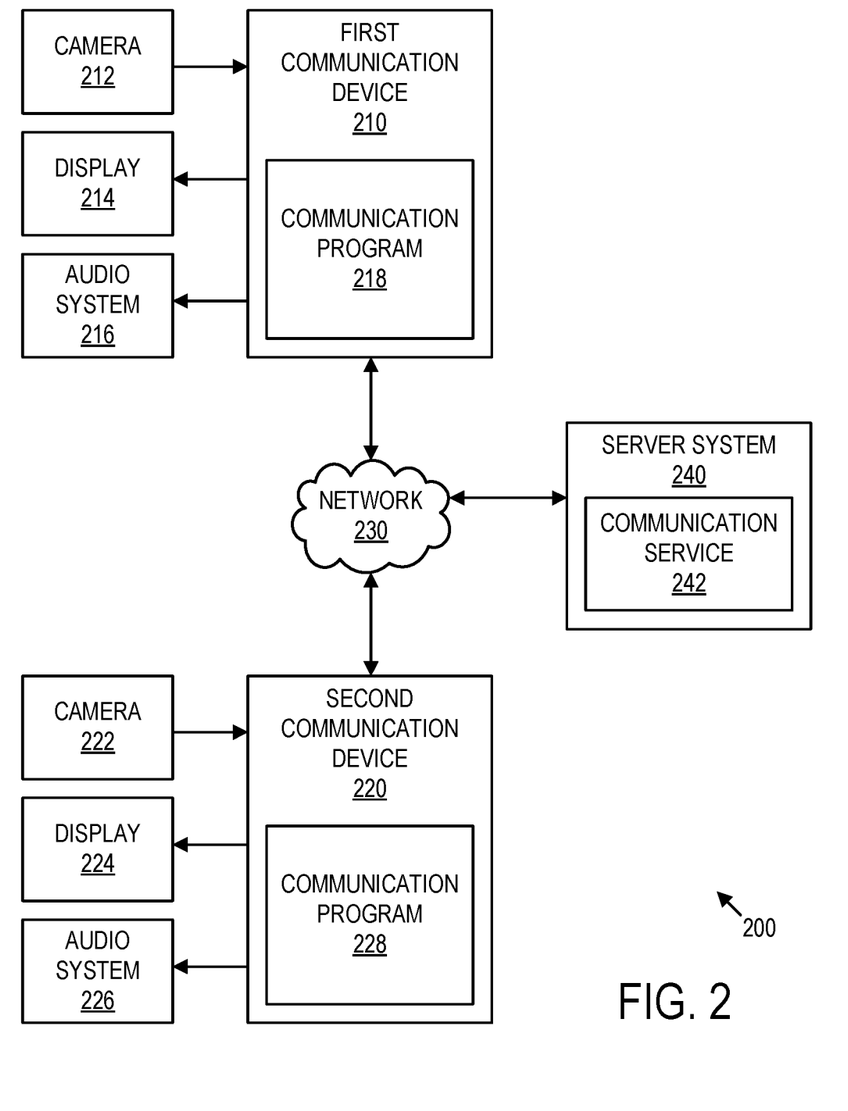
FIG. 2 is a schematic diagram depicting an example computing system.

FIG. 2 is a schematic diagram depicting an example computing system 200, which includes a first communication device 210 communicating with a second communication device 220 via a communications network 230. First communication device 210 is an example of first communication device 110 of FIG. 1. First communication device 210 may be associated with a camera 212, a display device 214, and an audio system 216, each of which may be integrated with or peripheral to the first communication device. Similarly, second communication device 220 may be associated with a camera 222, a display device 224, and an audio system 226, each of which may be integrated with or peripheral to the second communication device. Second communication device 220 is an example of second communication device 120 of FIG. 1.

As previously described with reference to FIG. 1, communications between first and second communication devices 210, 220 may take the form of a video conference by which a video stream captured by a camera of each of the first and second communication devices is graphically displayed on a display device of the other of the first and second communication devices. Additionally, audio captured by a microphone of the audio system of each of the first and second communication devices 210, 220 may be reproduced as an audio output by a speaker of the audio system of the other of the first and second communication devices. Accordingly, users of the first and second communication devices 210, 220 may be able to see and hear each other during the video conference. Computing system 200 may include any suitable quantity of communication devices that may engage in a multi-party video conference, including two, three, dozens, or more communication devices by which any suitable quantity of users may participate.

First and second communication devices 210, 220 may each take the form of any suitable computing device. First communication device 210 may, for example, execute a communication program 218 to engage in a video conference with second communication device 220 or additional communication devices. Similarly, second communication device 220 may, for example, execute a communication program 228 to engage in a video conference with first communication device 210 or additional communication devices. The segmentation and/or compositing of video streams described herein may be performed at communication programs 218 and 228, in at least some examples. Additional aspects of an example computing system and an example computing device will be described in further detail with reference to FIG. 5.

Video conferences between first and second communication devices 210, 220 or additional communication devices may be facilitated by a server system 240 of one or more server computing devices, in at least some examples. Server system 240 may execute a communication service 242 that supports some or all aspects of a video conference between first and second communication devices 210, 220. In at least some examples, the segmentation and/or compositing of video streams described herein may be performed at communication service 242. For example, video streams may be transmitted by each of communication programs 218, 228 to communication service 242 for processing and delivery to communication programs of the communication devices engaged in a video conference. Server system 240 may be omitted in at least some examples by which first and second communication devices 210, 220 may participate in a video conference without necessarily relying upon an intermediate server system to facilitate aspects of the video conference.

Figure 3:
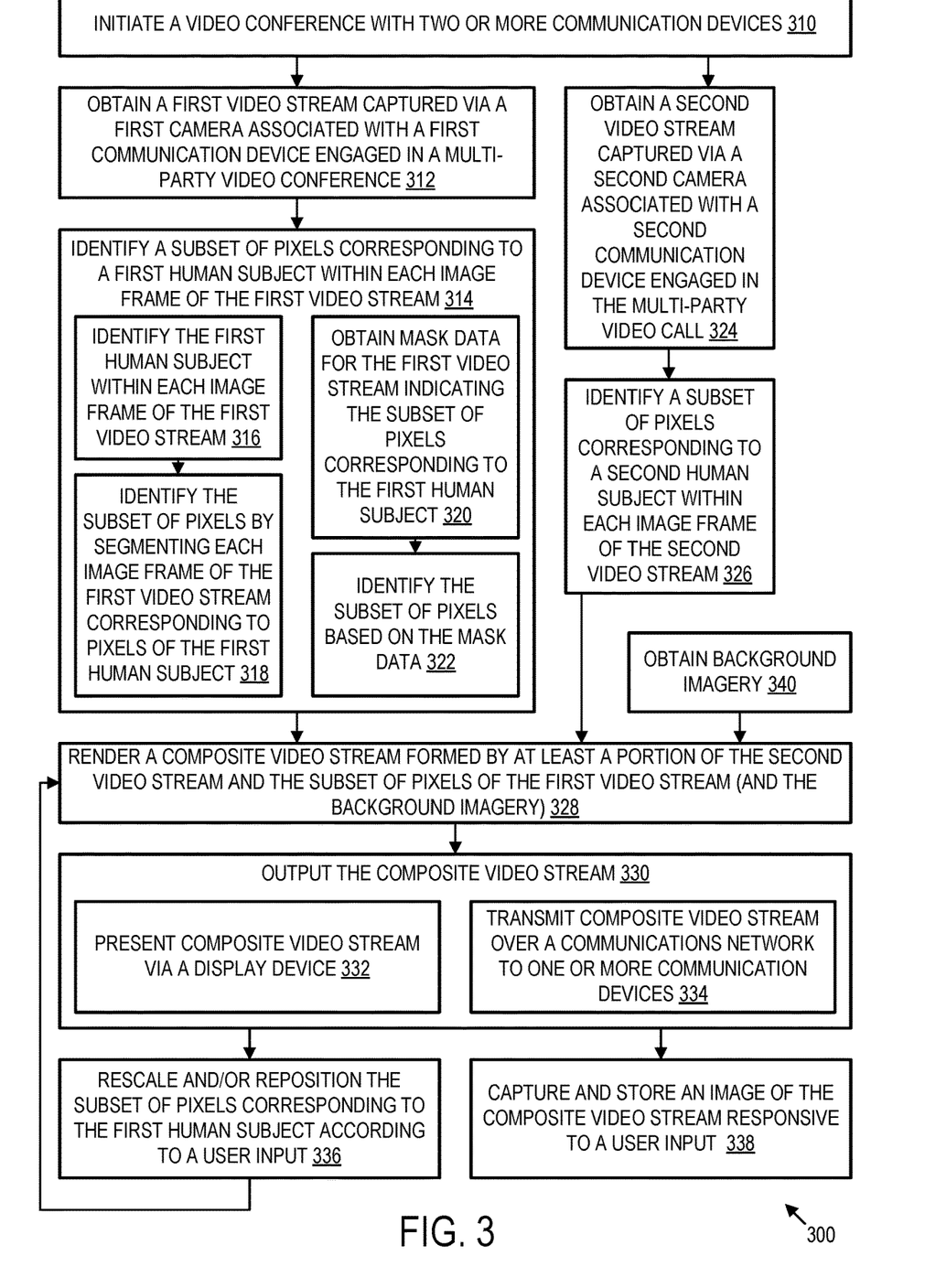
FIG. 3 is a flow diagram depicting an example video conferencing method.

FIG. 3 is a flow diagram depicting an example video conferencing method 300. Method 300 may be performed by a computing system that includes one or more computing devices. As an example, computing system 200 of FIG. 2 may perform method 300 or portions thereof.

At 310, the method includes initiating a video conference involving two or more communication devices to establish a multi-party video conference. The video conference may be conducted over a communications network connecting the two or more communication devices, and may traverse an intermediate server system, in at least some examples. Typically, at least one participant initiates a video conference via their respective communication device, which may include a user selection of one or more additional participants to invite to the video conference. Participants invited to a video conference may be alerted via their respective communication devices as an incoming call from the communication device of the participant that initiates the voice conference. Alternatively or additionally, participants may navigate to a common network resource to join a video conference via their respective communication device.

At 312, the method includes obtaining a first video stream captured via a first camera associated with a first communication device engaged in the multi-party video conference. The first video stream may include or take the form of a plurality of two-dimensional image frames. Each two-dimensional image frame may include a two-dimensional arrangement of pixels each of which has a respective identifiable location and associated pixel values (e.g., color, intensity, etc.) within the image frame.

At 314, the method includes identifying a subset of pixels corresponding to a first human subject within each image frame of the first video stream. In a first example, processes 312 and 314 may be performed locally by a source communication device that is associated with the camera that captured the first video stream. In a second example, processes 312 and 314 may be performed remotely by a server system that is connected to the source communication device via a communications network. In this example, the server system may obtain the first video stream by the source communication device transmitting the first video stream to the server system over the communications network. In a third example, processes 312 and 314 may be performed by a remote communication device that is engaged in the video conference with the source communication device. In this example, the remote communication device may obtain the first video stream by the source communication device transmitting the first video stream to the remote communication device over the communications network, which may or may not traverse an intermediate server system, depending on implementation.

Processing the first video stream to identify the subset of pixels at 314 may take various forms. In a first example, at 316, the method includes identifying the first human subject within each image frame of the first video stream. In at least some examples, a human subject may be identified within a video stream by application of computer vision to one or more of the image frames of the first video stream. For example, face detection algorithms may be applied to an image frame to identify a face of a human subject. A body model may be applied to the face to estimate a location of other body features, such as the torso and limbs. The body model may be scaled in size based on features detected within the face, for example. Feature detection may be applied to the image in combination with the detected face and body model to identify and distinguish an external boundary of the human subject from a background scene of the image. Other suitable techniques also may be used to identify a human subject within a video stream.

After identifying the first human subject at 316, the method includes, at 318, identifying the subset of pixels within each image frame by segmenting the subset of pixels within each image frame of the first video stream corresponding to pixels of the first human subject from another subset of pixels within the image frame corresponding to pixels of a background region. This segmenting of the subset of pixels may be used to obtain a mask region for each frame of the first video segment that corresponds to the first human subject or a portion thereof.

Segmentation may be performed by applying one or more background removal algorithms to each image frame. In at least some examples, background removal algorithms may be applied in real-time to support streaming media applicable to real-time video conferencing implementations. As an example, real-time chroma key background removal may be applied to each image frame (e.g., 2D image) to segment the subset of pixels corresponding to the human subject, where an appropriately-colored background is available. As another example, chroma-key-free segmentation may be applied to each image frame (e.g., 2D image) to segment the subset of pixels corresponding to the human subject. In some examples, such chroma-key-free segmentation may utilize machine learning, including deep-learning algorithms and may employ a deep, fully convolutional neural network (FCN) and/or SegNet, which employs a deep convolutional encoder-decoder architecture. A FCN and/or SegNet, for example, may be trained on semantic segmentation to make a prediction at each pixel of an image from supervised pre-training. SegNet, may include a trainable segmentation engine having an encoder network, a decoder network, and a per-pixel classification layer. Other forms of background removal also may be used, including algorithms configured for 2D image capture and/or 3D image capture.

The subset of pixels may be stored and communicated to other devices as mask data, in at least some examples. Processes 316 and 318 may be performed (1) at the source communication device, (2) at an intermediate server system, or (3) at a remote communication device engaged in the video conference, depending on implementation.

In a second example of processing the first video stream to identify the subset of pixels at 314, at 320, the method includes obtaining mask data for the first video stream from a remote computing device over a communications network. In an example, the mask data representing a mask region indicates the subset of pixels corresponding to the first human subject. Each pixel or range of pixels may be identified within a given image frame by respective pixel identifiers, for example. Continuing with this second example, at 322, the method includes identifying the subset of pixels based on the mask data. Processes 320 and 322 may be performed (1) at an intermediate server system, or (2) at a remote communication device engaged in the video conference, depending on implementation. For example, the source communication device may perform processes 316 and 318 to obtain mask data that is then transmitted to either a server system or a remote communication device engaged in the video conference where processes 320 and 322 may be performed. In at least some examples, the first video stream may be transmitted from the source communication device and/or server system to the remote communication device with the mask data, enabling the remote communication device to identify the subset of pixels corresponding to the human subject within each image frame of the first video stream.

At 324, the method includes obtaining a second video stream captured via a second camera associated with a second communication device engaged in the multi-party video conference. The second video stream may include a second human subject. In at least some examples, the second video stream may include a plurality of two-dimensional image frames, as previously described with respect to the first video stream.

At 326, the method includes identifying a subset of pixels corresponding to a second human subject within each image frame of the second video stream. Processes 324 and 326 may be performed with respect to the second video stream using any of the techniques previously described with reference to processes 312 and 314 for the first video stream. Further, in some examples, process 326 may be omitted, such as where a subset of pixels of the first video stream are combined with the entirety of the second video stream to obtain the composite video stream. Additional video streams may also be obtained and processed for any suitable quantity of communication devices and their participants as described with reference to the first and second video streams.

In some examples, background imagery may replace a real-world scene in a composite video stream of the video conference. Accordingly, at 340, the method includes obtaining background imagery including a background image or video. In a first example, the background imagery may take the form of previously stored background imagery residing at one of the communication devices engaged in the video conference, at a server system, or at a network resource accessible via a communications network. A user may, for example, select a particular item of background imagery from a library of available background imagery items. The background imagery may feature real or virtual subject matter, including real-world images or videos, animations, colors, or textures. In at least some examples, the communication device may support voice interaction in which a user may initiate a search for background imagery by speaking one or more words. For example, a user may speak the phrase "go to Hawaii" to initiate a search and retrieval for background imagery of Hawaii.

At 328, the method includes rendering a composite video stream formed by at least a portion of the second video stream and the subset of pixels of the first video stream. In a first example, the subset of pixels of the first video stream may be overlaid upon the second video stream on a frame-by-frame basis by temporally aligning image frames of each video stream with each other. In a second example, the composite video stream rendered at 328 may be formed by the background imagery obtained at 340, the first subset of pixels of the first video stream identified at 314, and the second subset of pixels of the second video stream identified at 326. In this example, the subset of pixels of the first video stream and the subset of pixels of the second video stream may be overlaid upon the background imagery.

An order of layering of imagery components within a composite video stream may be defined by a Z-order value that represents a depth of an imagery component (e.g., a subset of pixels corresponding to a human subject, a video stream, or background imagery) within the composite video stream or individual image frames thereof. In an example, a first subset of pixels corresponding to a first human subject may be associated with a first Z-order value, and a second subset of pixels corresponding to a second human subject may be associated with a second Z-order value that differs from the first Z-order value. One of the first subset of pixels and the second subset of pixels may be overlaid upon another of the first subset pixels and the second subset of pixels within at least some image frames of the composite video stream based on the first and second Z-order values, respectively. For example, a greater Z-order value may correspond to a greater depth as compared to a lesser Z-order value, in which case a subset of pixels associated with a lesser Z-order value would be overlaid upon another subset of pixels, video stream, or background imagery associated with a greater Z-order value within the composite video stream or individual image frames thereof. Z-order value may be assignable or selectable by users, such as by directing a user input to a selector of a graphical user interface or other user input modality, thereby enabling users to define which human subjects are presenting in the foreground or background within a composite video stream.

In at least some examples, the subset of pixels corresponding to the first human subject in the composite video stream may be programmatically positioned and/or scaled. As an example, the subset of pixels corresponding to the first human subject may be initially positioned within a viewable region of the composite video stream at a different location than the second human subject to reduce or avoid overlap among human subjects. As another example, a graphical representation of the first human subject within a viewable region of the composite video stream may be initially scaled upward or downward in size to occupy a programmatically defined height dimension, width dimension, and/or area within the viewable region. For example, the first human subject may be scaled to achieve a height dimension that approximates a height dimension of another human subject within the composite video stream. This scaling and positioning process may be programmatically performed for each subset of pixels corresponding to a human subject represented within the composite video stream.

Process 328 may be performed (1) at one or more of the communication devices or (2) at an intermediate server system, depending on implementation. In an example, the intermediate server system renders the composite video stream, and transmits an instance of the composite video stream to some or all of the communication devices engaged in the video conference. In another example, an individual communication device renders the composite video stream, and transmits an instance of the composite video stream to some or all of the other communication devices engaged in the video conference. In yet another example, each communication device renders its own instance of the composite video stream, thereby enabling two or more communication devices to render and present different composite video streams. For example, each communication device may render a participant-specific composite video stream by overlaying a subset of pixels of a remote video stream received from a remote communication device upon a local video stream, or vice-versa. In a further example, each communication device may use different background imagery, and may render a participant-specific composite video stream using its particular background imagery in combination with one or more mask regions identified from remote video streams.

At 330, the method includes outputting the composite video stream for presentation by one or more communication devices engaged in the video conference. In an example, outputting the composite video stream includes presenting the composite video stream via a display device at 332. The composite video may be output as part of a graphical user interface presented via the display device, for example. The display device may be associated with the first communication device, the second communication device, or other communication devices engaged in the video conference. In another example, outputting the composite video stream includes transmitting the composite video stream over a communications network to one or more other communication devices at 334. For example, a server system or a communication device may transmit the composite video stream to some or all of the other communication devices engaged in the video conference. Additionally, in at least some examples, one of the first video stream or the second video stream may be output as another part of the graphical user interface presented via the display device concurrently with the composite video stream. An example graphical user interface is described in further detail with reference to FIG. 4.

At 336, the method includes rescaling and/or repositioning the subset of pixels corresponding to the first human subject within a viewable region of the composite video stream according to a user input. This process may be performed for each subset of pixels corresponding to a human subject represented within the composite video stream. In an example, the subset of pixels corresponding to the first human subject and/or the second human subject may be repositioned relative to a viewable region of the composite video to provide the appearance that the human subjects are moving in relation to each other and/or their background environment. For example, a user of the first communication device that captured the first human subject may provide a user input to move the graphical representation of the first human subject within the composite video stream, and a user of the second communication device may provide a user input to move the graphical representation of the second human subject within the composite video stream. Repositioning of the subset of pixels corresponding to a human subject may include adjustment to Z-order values that define a depth of the pixels within the composite video stream, thereby enabling imagery previously residing in a foreground layer to be repositioned to a background layer, or vice-versa. Scaling of graphical representations of human subjects may be performed responsive to a user input, for example, to increase or decrease a relative size of the graphical representation within a viewable region of the composite video stream. This feature may enable two or more human subjects to appear within the composite video at similar or different relative sizes, or may be used to provide the appearance of distance perspective within the composite video stream. User input may be transmitted via a communication network as one or more commands that may be implemented at a server system or remote communication device.

In at least some examples, instead of compositing pixels from a second video stream and pixels of a first video stream into a composite video stream, a body model may be assigned to one or more of the first and second subsets of pixels, and a physics model may be applied to spatial interaction between the body model of each of the first and second subsets of pixels to provide an interactive environment within the composite video stream. For example, graphical representations of two or more human subjects may contact each other or other graphical objects within the composite video stream to cause a resulting interaction. Two or more participants of a video conference may engage in a game or may complete tasks within a composite video stream that includes interactions by their graphical representations.

As previously discussed, a composite video stream may provide the appearance of two or more remotely located participants of a video conference being located within a shared environment, which may promote user interaction and provide a sense of togetherness. While engaged in the video conference, it may be entertaining or enjoyable for the participants to memorialize their shared experience afforded by the composite video stream by capturing a photograph or sequence of photographs. At 338, the method includes, responsive to a user input, capturing one or more images of the composite video stream, and storing the one or more images of the composite video stream. In an example, the composite video stream is output as part of a graphical user interface that includes an image capture selector, and the user input includes selection of the image capture selector. However, other suitable forms of user input may be used to initiate capture and storage of an image of the composite video stream.

FIG. 4 is a schematic diagram depicting an example graphical user interface (GUI) 400 that may be presented via a display device. GUI 400 may form part of a communication program executable at a communication device, such as previously described with reference to FIG. 2. In an example, a primary region 410 of the GUI 400 may correspond to a region where a composite video stream or a video stream from a remote communication device may be displayed, depending upon user selection. In the example depicted in FIG. 4, a composite video stream is displayed within primary region 410, which includes background imagery of a baseball stadium upon which graphical representations of a first user 420 and a second user 422 are overlaid. First user 420 may be remotely located from second user 422 while engaged in a video conference with each other, such as previously described with reference to users 112 and 122 of FIG. 1, for example. Furthermore, in this example, imagery of first user 420 is overlaid upon imagery of second user 422, which may be defined by the previously described Z-order values.

A secondary region 412 of GUI 400 may correspond to a local or remote video stream, which may be selectable by a user. Secondary region 412 may be omitted in some examples. GUI 400 further may include one or more graphical selectors, illustrated here by 414, 416, and 418. In an example, graphical selector 414 may correspond to the previously described image capture selector of FIG. 3. Graphical selector 416 may correspond to a mode selector that enables a user to stitch between displaying a composite video stream (e.g., as depicted at 130 in FIG. 1) or displaying one or more discrete video streams of local or remote participants (e.g., as depicted at display device 114 in FIG. 1). Graphical selector 418 may provide additional functions, such as the selection of background imagery or the repositioning/resealing of graphical representations of human subjects within a composite video stream. While FIG. 4 depicts a variety of graphical selectors for performing or initiating a variety of functions, it will be understood that a GUI may support touch interaction and touch-based gestures that may be used to perform or initiate these various functions. As examples, pinch or stretch gestures involving two or more concurrent touches of a touch-sensitive input device may be used to rescale a graphical representation of a human subject, or a touch and drag gesture applied to a touch-sensitive input device may be used to reposition a graphical representation of a human subject.

In some examples, the methods and processes described herein may be tied to a computing system of one or more computing devices. In particular, such methods and processes may be implemented as a computer-application program or service, an application-programming interface (API), a library, and/or other computer-program product.

Figure 5:
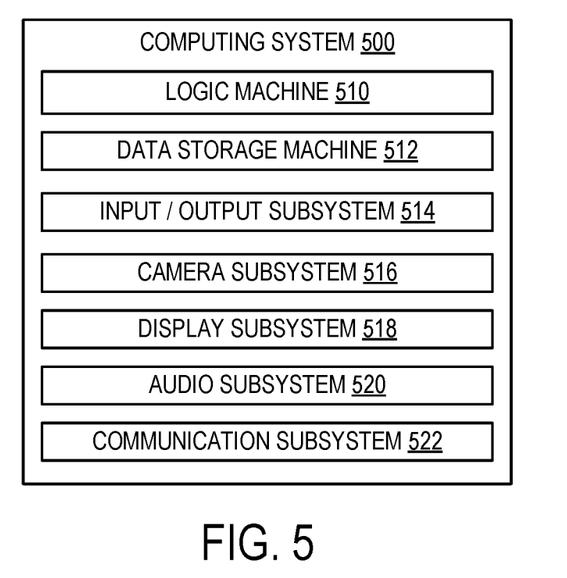
FIG. 5 is a schematic diagram depicting aspects of an example computing system.

FIG. 5 schematically shows an example of a computing system 500 that can enact one or more of the methods and processes described herein. Computing system 500 is shown in simplified form. Computing system 500 may take the form of one or more personal computers, server computers, tablet computers, home-entertainment computers, network computing devices, gaming devices, mobile computing devices, communication devices, mobile communication devices (e.g., smart phone), and/or other computing devices.

Computing system 500 includes a logic machine 510 and a data storage machine 512. Computing system 500 may further include an input/output subsystem 514, a camera subsystem 516, a display subsystem 518, an audio subsystem 520, a communication subsystem 522, and/or other components not shown in FIG. 5.

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 512 includes one or more physical devices configured to hold instructions executable by the logic machine to implement the methods and processes described herein. When such methods and processes are implemented, the state of storage machine 512 may be transformed—e.g., to hold different data.

Storage machine 512 may include removable and/or built-in devices. Storage machine 512 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 512 may include volatile, nonvolatile, dynamic, static, read/write, read-only, random-access, sequential-access, location-addressable, file-addressable, and/or content-addressable devices.

It will be appreciated that storage machine 512 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 510 and storage machine 512 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 510 implemented to perform a particular function. In some cases, a module, program, or engine may be instantiated via logic machine 510 executing instructions held by storage machine 512. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, input/output subsystem 514 may comprise or interface with one or more input device or output devices such as a keyboard, mouse, touch screen, game controller, microphone, audio speaker, camera, etc. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, camera subsystem 516 may be used to capture imagery, including static images and/or video streams comprising a series of time-ordered image frames. Camera subsystem 516 may include one or more cameras, including two-dimensional image capturing cameras, three-dimensional cameras, optical depth sensors, etc. Imagery captured by camera subsystem 516 may include color imagery, black and white imagery, infrared imagery, or a combination thereof. Camera subsystem 516 or its one or more cameras may be combined with logic machine 510 and/or storage machine 512 in a shared enclosure, or may be peripheral to the enclosure, and may interface with computing system 500 via input/output subsystem 514.

When included, display subsystem 516 may be used to present a visual representation of data held by storage machine 512. This visual representation may take the form of a graphical user interface (GUI). As the herein described methods and processes change the data held by the storage machine, and thus transform the state of the storage machine, the state of display subsystem 516 may likewise be transformed to visually represent changes in the underlying data. Display subsystem 516 may include one or more display devices utilizing virtually any type of technology. Such display devices may be combined with logic machine 510 and/or storage machine 512 in a shared enclosure, or such display devices may be peripheral display devices, and may interface with computing system 500 via input/output subsystem 514.

When included, audio subsystem 520 may be used to capture or output audio. Audio subsystem 520 may include one or more microphones and/or one or more audio speakers. Audio subsystem 520 or its one or more microphones and/or speakers may be combined with logic machine 510 and/or storage machine 512 in a shared enclosure, or may be peripheral to the enclosure, and may interface with computing system 500 via input/output subsystem 514.

When included, communication subsystem 522 may be configured to communicatively couple computing system 500 with one or more other computing devices. Communication subsystem 522 may include wired and/or wireless communication devices compatible with one or more different communication protocols. As examples, the communication subsystem may be configured for communication via a wireless telephone network, or a wired or wireless local- or wide-area network. In some examples, the communication subsystem may allow computing system 500 to send and/or receive messages to and/or from other devices via a network such as the Internet.

Another example provides a method performed by a computing system comprising obtaining a first video stream captured via a first camera associated with a first communication device engaged in a multi-party video conference, the first video stream including a plurality of two-dimensional image frames; identifying a subset of pixels corresponding to a first human subject within each image frame of the first video stream; obtaining a second video stream captured via a second camera associated with a second communication device engaged in the multi-party video conference; rendering a composite video stream formed by at least a portion of the second video stream and the subset of pixels of the first video stream; and outputting the composite video stream. In this example or any other example disclosed herein, the method further comprises identifying the first human subject within each image frame of the first video stream; and identifying the subset of pixels within each image frame includes segmenting the subset of pixels within each image frame of the first video stream corresponding to pixels of the first human subject from another subset of pixels within that image frame corresponding to pixels of a background region. In this example or any other example disclosed herein, the first human subject is identified by application of computer vision to one or more of the image frames of the first video stream. In this example or any other example disclosed herein, the method further comprises obtaining mask data for the first video stream from a remote computing device over a communications network, the mask data indicating the subset of pixels corresponding to the first human subject; and identifying the subset of pixels is based on the mask data. In this example or any other example disclosed herein, outputting the composite video stream includes presenting the composite video stream via a display device. In this example or any other example disclosed herein, outputting the composite video stream includes transmitting the composite video stream over a communications network to one or more of the first communication device and/or the second communication device. In this example or any other example disclosed herein, the composite video stream is output as part of a graphical user interface presented via a display device in which the graphical user interface further includes an image capture selector. In this example or any other example disclosed herein, the method further comprises, responsive to a user selection of the image capture selector, capturing an image of the composite video. In this example or any other example disclosed herein, the second video stream includes a second human subject. In this example or any other example disclosed herein, the method further comprises identifying a location of the second human subject within each image frame of the second video stream; and positioning the subset of pixels corresponding to the first human subject within the composite video stream at a different location than the location of the second human subject. In this example or any other example disclosed herein, the method further comprises rescaling and/or repositioning the subset of pixels corresponding to the first human subject within the composite video stream according to a user input. In this example or any other example disclosed herein, the composite video stream is rendered by overlaying the subset of pixels of the first video stream upon the second video stream. In this example or any other example disclosed herein, the method further comprises obtaining background imagery including a background image or video; the composite video stream is further formed by the background imagery; and the composite video stream is rendered by overlaying the first subset of pixels of the first video stream upon the background imagery. In this example or any other example disclosed herein, the method further comprises identifying a second subset of pixels corresponding to a second human subject within each image frame of the second video stream; and the composite video stream is rendered by overlaying the second subset of pixels of the second video stream upon the background imagery. In this example or any other example disclosed herein, the first subset of pixels corresponding to the first human subject is associated with a first Z-order value; the second subset of pixels corresponding to the second human subject is associated with a second Z-order value that differs from the first Z-order value; and one of the first subset of pixels and the second subset of pixels is overlaid upon another of the first subset pixels and the second subset of pixels within at least some image frames of the composite video stream based on the first and second Z-order values.

Another example provides a computing system comprising one or more computing devices having instructions executable thereon to: obtain a first video stream captured via a first camera associated with a first communication device engaged in a multi-party video conference, the first video stream including a plurality of two-dimensional image frames; identify a subset of pixels corresponding to a first human subject within each image frame of the first video stream; obtain a second video stream captured via a second camera associated with a second communication device engaged in the multi-party video conference; render a composite video stream formed by at least a portion of the second video stream and the subset of pixels of the first video stream; and output the composite video stream for display by one or more of the first communication device and/or the second communication device. In this example or any other example disclosed herein, the composite video stream is rendered by overlaying the subset of pixels of the first video stream upon the second video stream. In this example or any other example disclosed herein, the instructions are further executable by the one or more computing devices to obtain background imagery including a background image or video; the composite video stream is further formed by the background imagery; and the composite video stream is rendered by overlaying the first subset of pixels of the first video stream upon the background imagery. In this example or any other example disclosed herein, the instructions are further executable by the one or more computing devices to: identify a second subset of pixels corresponding to a second human subject within each image frame of the second video stream; and the composite video stream is rendered by overlaying the second subset of pixels of the second video stream upon the background imagery. In this example or any other example disclosed herein, the instructions are further executable by the one or more computing devices to identify the first human subject within each image frame of the first video stream; and the subset of pixels is identified within each image frame by segmenting the subset of pixels within each image frame of the first video stream corresponding to pixels of the first human subject from another subset of pixels within that image frame corresponding to pixels of a background region. In this example or any other example disclosed herein, the instructions are further executable by the one or more computing devices to obtain mask data for the first video stream from a remote computing device over a communications network, the mask data indicating the subset of pixels corresponding to the first human subject; and identifying the subset of pixels is based on the mask data.

Another example provides a method performed by a computing system, the method comprising obtaining a first video stream captured via a first camera associated with a first communication device engaged in a multi-party video conference, the first video stream including a plurality of two-dimensional image frames; identifying a first subset of pixels corresponding to a first human subject within each image frame of the first video stream; obtaining a second video stream captured via a second camera associated with a second communication device engaged in the multi-party video conference, the second video stream including a plurality of two-dimensional image frames; rendering a composite video stream formed by the first subset of pixels of the first video stream and at least a portion of the second video stream; outputting the composite video stream for presentation via a display device as part of a graphical user interface that includes an image capture selector; and responsive to a user selection of the image capture selector, capturing an image of the composite video.

It will be understood that the configurations and/or approaches described herein are exemplary in nature, and that these examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system, the method comprising:
   obtaining a first video stream captured via a first camera associated with a first communication device engaged in a multi-party video conference, the first video stream including a first plurality of image frames;
   identifying a first subset of pixels corresponding to a first human subject within each image frame of the first plurality of image frames;
   obtaining a second video stream captured via a second camera associated with a second communication device engaged in the multi-party video conference, the second video stream including a second plurality of image frames;
   rendering a composite video stream formed by at least a portion of the second video stream and the first subset of pixels of the first video stream;
   rescaling, repositioning, or rescaling and repositioning the first subset of pixels corresponding to the first human subject relative to a viewable region of the composite video stream according to a user input received from a remote computing device; and
   outputting the composite video stream.

2. The method of claim 1, further comprising:
   identifying the first human subject within each image frame of the first video stream; and
   wherein identifying the first subset of pixels within each image frame includes segmenting the first subset of pixels within each image frame of the first video stream corresponding to pixels of the first human subject from another subset of pixels within that image frame corresponding to pixels of a background region.

3. The method of claim 2, wherein the first human subject is identified by application of computer vision to one or more of the image frames of the first video stream.

4. The method of claim 1, further comprising:
   obtaining mask data for the first video stream from a remote computing device over a communications network, the mask data indicating the first subset of pixels corresponding to the first human subject; and
   wherein identifying the first subset of pixels is based on the mask data.

5. The method of claim 1, wherein outputting the composite video stream includes presenting the composite video stream via a display device;
   wherein the plurality of image frames of the first video stream are two-dimensional image frames; and
   wherein the plurality of image frames of the second video stream are two-dimensional image frames.

6. The method of claim 1, wherein outputting the composite video stream includes transmitting the composite video stream over a communications network to at least one of the first communication device or the second communication device.

7. The method of claim 1, wherein the composite video stream is output as part of a graphical user interface presented via a display device in which the graphical user interface further includes an image capture selector; and
   wherein the method further comprises, responsive to a user selection of the image capture selector, capturing an image of the composite video.

8. The method of claim 1, wherein the second video stream includes a second human subject, and wherein the method further comprises:
   identifying a location of the second human subject within each image frame of the second video stream; and
   positioning the first subset of pixels corresponding to the first human subject within the composite video stream at a different location than the location of the second human subject.

9. The method of claim 1,
   wherein rescaling, repositioning, or rescaling and repositioning the subset of pixels corresponding to the first human subject within the composite video stream includes repositioning the subset of pixels relative to the viewable region of the composite video stream according to the user input.

10. The method of claim 1, wherein the composite video stream is rendered by overlaying the first subset of pixels of the first video stream upon the second video stream.

11. The method of claim 1, further comprising:
    obtaining background imagery including a background image or video;
    wherein the composite video stream is further formed by the background imagery; and
    wherein the composite video stream is rendered by overlaying the first subset of pixels of the first video stream upon the background imagery.

12. The method of claim 11, further comprising:
    identifying a second subset of pixels corresponding to a second human subject within each image frame of the second video stream; and
    wherein the composite video stream is rendered by overlaying the second subset of pixels of the second video stream upon the background imagery.

13. The method of claim 12, wherein the first subset of pixels corresponding to the first human subject is associated with a first Z-order value;
    wherein the second subset of pixels corresponding to the second human subject is associated with a second Z-order value that differs from the first Z-order value; and
    wherein one of the first subset of pixels and the second subset of pixels is overlaid upon another of the first subset pixels and the second subset of pixels within at least some image frames of the composite video stream based on the first and second Z-order values.

14. A computing system, comprising:
    one or more computing devices having instructions executable thereon to:
       obtain a first video stream captured via a first camera associated with a first communication device engaged in a multi-party video conference, the first video stream including a first plurality of image frames;

identify a first subset of pixels corresponding to a first human subject within each image frame of the first plurality of image frames;

obtain a second video stream captured via a second camera associated with a second communication device engaged in the multi-party video conference, the second video stream including a second plurality of image frames;

render a composite video stream formed by at least a portion of the second video stream and the first subset of pixels of the first video stream;

rescale, reposition, or rescale and reposition the first subset of pixels corresponding to the first human subject relative to a viewable region of the composite video stream according to a user input received from a remote computing device; and output the composite video stream for display by the first communication device, the second communication device, or the first communication device and the second communication device.

15. The computing system of claim 14, wherein the composite video stream is rendered by overlaying the first subset of pixels of the first video stream upon the second video stream;

wherein the plurality of image frames of the first video stream are two-dimensional image frames; and wherein the plurality of image frames of the second video stream are two-dimensional image frames.

16. The computing system of claim 14, wherein the instructions are further executable by the one or more computing devices to:

obtain background imagery including a background image or video;

wherein the composite video stream is further formed by the background imagery; and wherein the composite video stream is rendered by overlaying the first subset of pixels of the first video stream upon the background imagery.

17. The computing system of claim 16, wherein the instructions are further executable by the one or more computing devices to:

identify a second subset of pixels corresponding to a second human subject within each image frame of the second video stream; and wherein the composite video stream is rendered by overlaying the second subset of pixels of the second video stream upon the background imagery.

18. The computing system of claim 14, wherein the instructions are further executable by the one or more computing devices to:

identify the first human subject within each image frame of the first video stream; and wherein the first subset of pixels is identified within each image frame by segmenting the first subset of pixels within each image frame of the first video stream corresponding to pixels of the first human subject from another subset of pixels within that image frame corresponding to pixels of a background region.

19. The computing system of claim 14, wherein the instructions are further executable by the one or more computing devices to:

obtain mask data for the first video stream from a remote computing device over a communications network, the mask data indicating the first subset of pixels corresponding to the first human subject; and wherein identifying the first subset of pixels is based on the mask data.

20. A method performed by a computing system, the method comprising:

obtaining a first video stream captured via a first camera associated with a first communication device engaged in a multi-party video conference, the first video stream including a first plurality of image frames;

identifying a first subset of pixels corresponding to a first human subject within each image frame of the first plurality of image frames;

obtaining a second video stream captured via a second camera associated with a second communication device engaged in the multi-party video conference, the second video stream including a second plurality of image frames;

rendering a composite video stream formed by the first subset of pixels of the first video stream and at least a portion of the second video stream;

rescaling, repositioning, or rescaling and repositioning the first subset of pixels corresponding to the first human subject relative to a viewable region of the composite video stream according to a user input received from a remote computing device;

outputting the composite video stream for presentation via a display device as part of a graphical user interface that includes an image capture selector; and responsive to a user selection of the image capture selector, capturing an image of the composite video.

* * * * *